July 11, 1967     R. K. H. GEBEL     3,330,904
NARROW BAND LONG RANGE COLOR TELEVISION
SYSTEM INCORPORATING COLOR ANALYZER
Filed March 29, 1965     13 Sheets-Sheet 1

INVENTOR
*R. K. H. GEBEL*

Harry A. Herbert Jr
ATTORNEY

BY

James S. Shannon
AGENT

INVENTOR
R.K.H. GEBEL

Harry A. Herbert Jr
ATTORNEY

BY

James S. Shanson
AGENT

INVENTOR
R.K.H. GEBEL

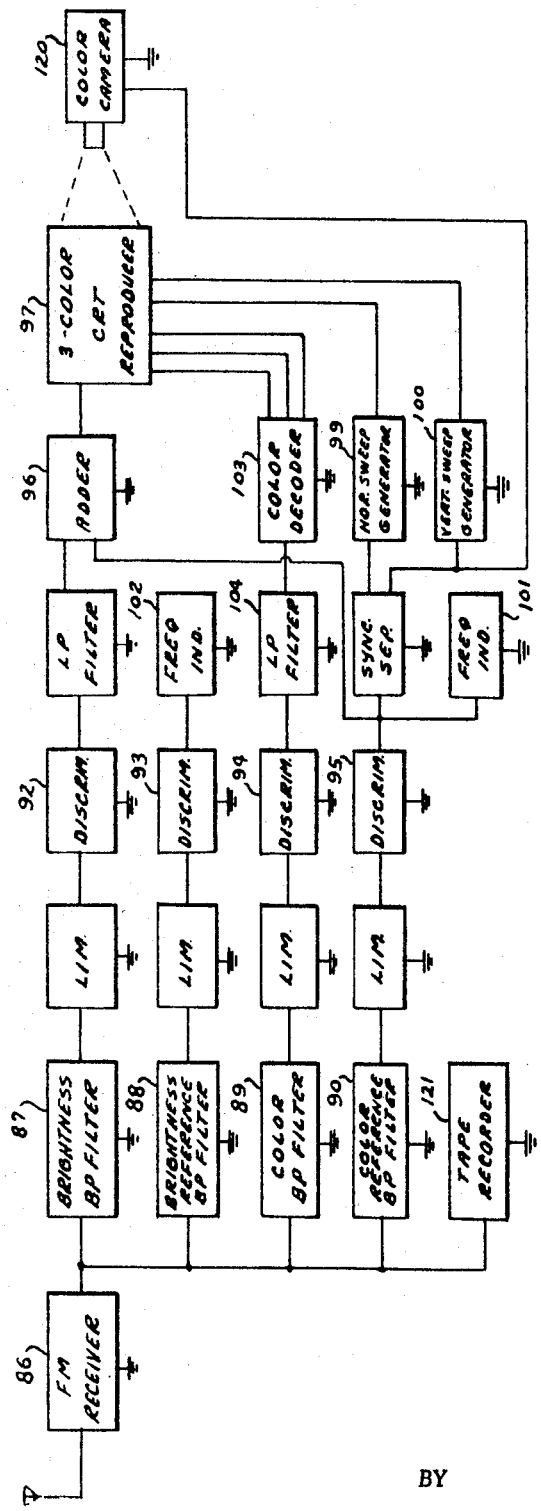

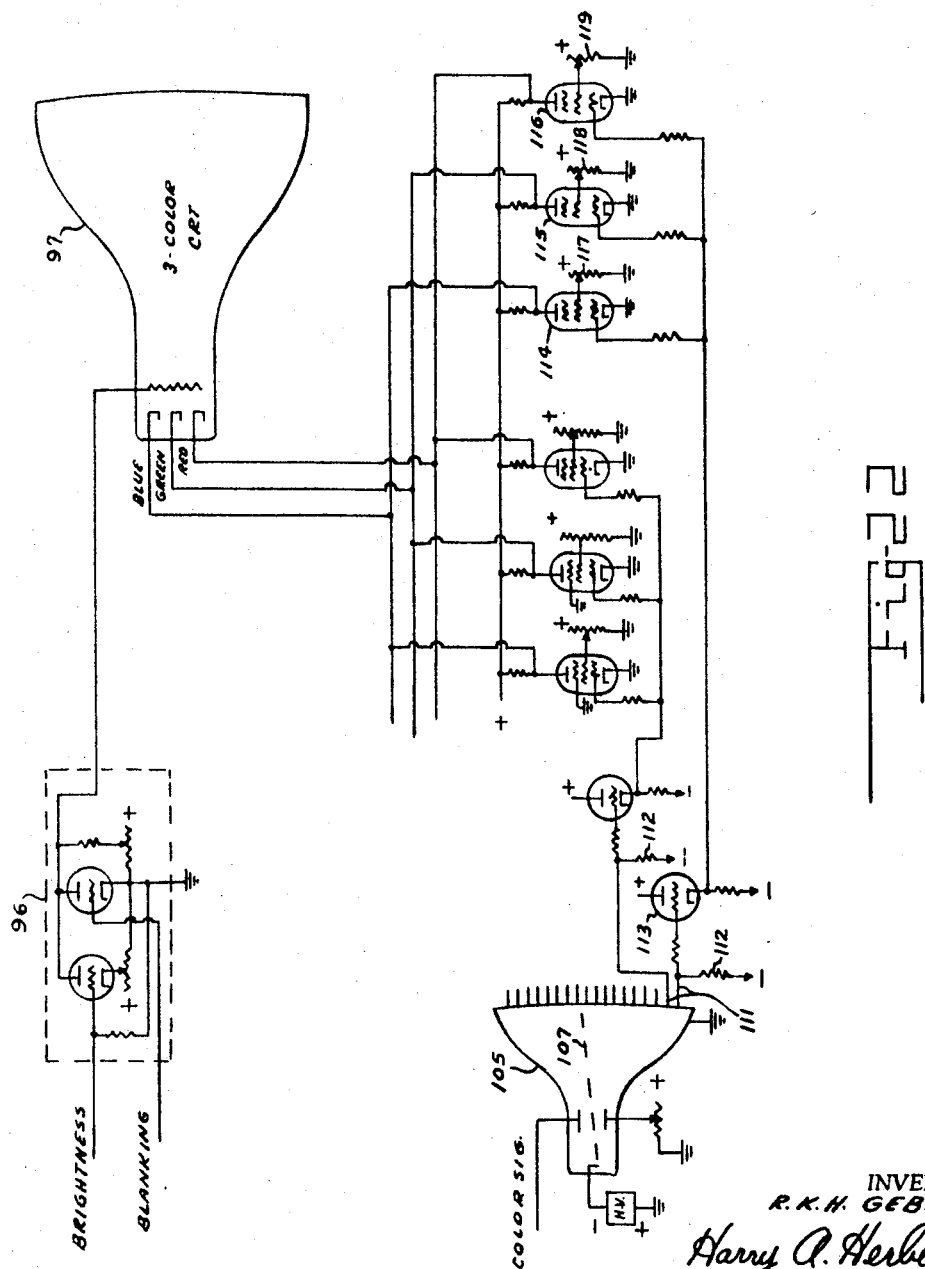

United States Patent Office 3,330,904
Patented July 11, 1967

1

3,330,904
NARROW BAND LONG RANGE COLOR TELEVISION SYSTEM INCORPORATING COLOR ANALYZER
Radames K. H. Gebel, Dayton, Ohio, assignor to the United States of America as represented by the Secretary of the Air Force
Filed Mar. 29, 1965, Ser. No. 443,722
4 Claims. (Cl. 178—5.2)

ABSTRACT OF THE DISCLOSURE

A narrow band color television system and a color matching system each incorporating a color analyzer that derives analogs of the brightness and chromaticity of received light, the chromaticity analog defining a position in the C.I.E. color triangle. In the television system, the analogs frequency modulate a transmitter and are thus conveyed to the receiver where they serve to control the brightness and hue of a tricolor picture tube. In the color matching system, chromaticity is defined by analogs representing hue and saturation which may be used, for example, to automatically produce a matching mixture of white and colored paints.

---

The invention described herein may be manufactured and used by or for the United States Government for governmental purposes without the payment to me of any royalty thereon.

In the transmission of information over great distances, such as encountered in space exploration, a narrow bandwidth is desirable in order to preserve a good signal-to-noise ratio. Frequency modulation is also preferred to amplitude modulation in order to desensitize the receiver to noise and to amplitude modulation of the desired signal by possible tumbling of the spacecraft. At the same time color information about the planets such as Mars and Venus is very important since it assists in forming a judgement as to which areas of the planet have ice, sand, lichens or other vegetation, water, etc. It is the principal object of the invention to provide a color television system particularly adapted to space transmission from the standpoint of conservation of bandwidth and simplicity of the transmitter. A furtther object of the invention is to provide a color analyzer that will determine the chromaticity of a color, i.e. its position in the C.I.E. (Commission International de l'Eclairage) color triangle, and its brightness.

Briefly, the television system is accordance with the invention comprises at the transmitter the above mentioned color analyzer which determines the chromaticity and brightness of each elemental area of the viewed scene. These two factors are converted to corresponding frequencies which are transmitted to the receiver by a frequency modulated radio link. At the receiver the brightness and chromaticity signals are recovered and used to control the brightness and color of a 3-color cathode ray picture tube. In addition to its use in a television system, the chromaticity portion of the color analyzer may be used to determine chromaticity in terms of hue and saturation or whiteness and to control, for example, an automatic paint mixer or analogous apparatus in accordance therewith.

Figure 1:
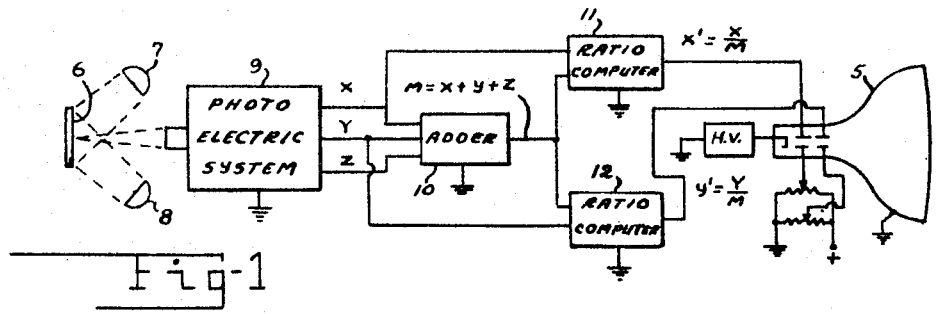
Figure 1A:
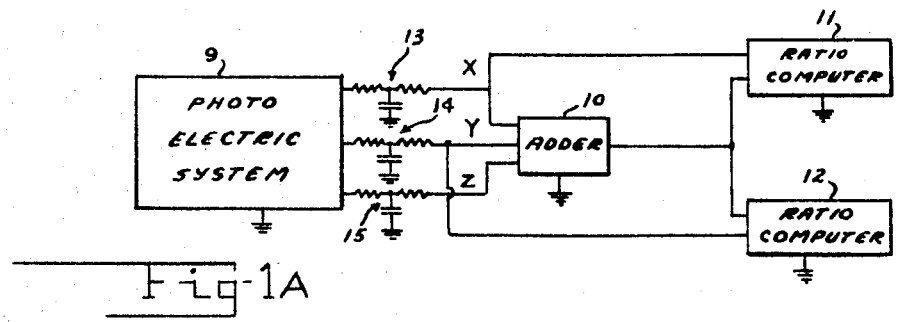
Figure 2:
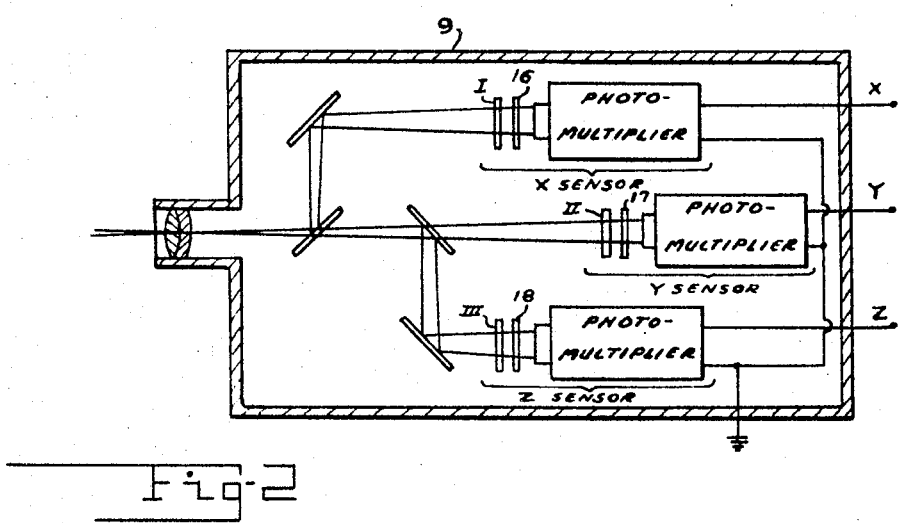
Figures 3, 4:
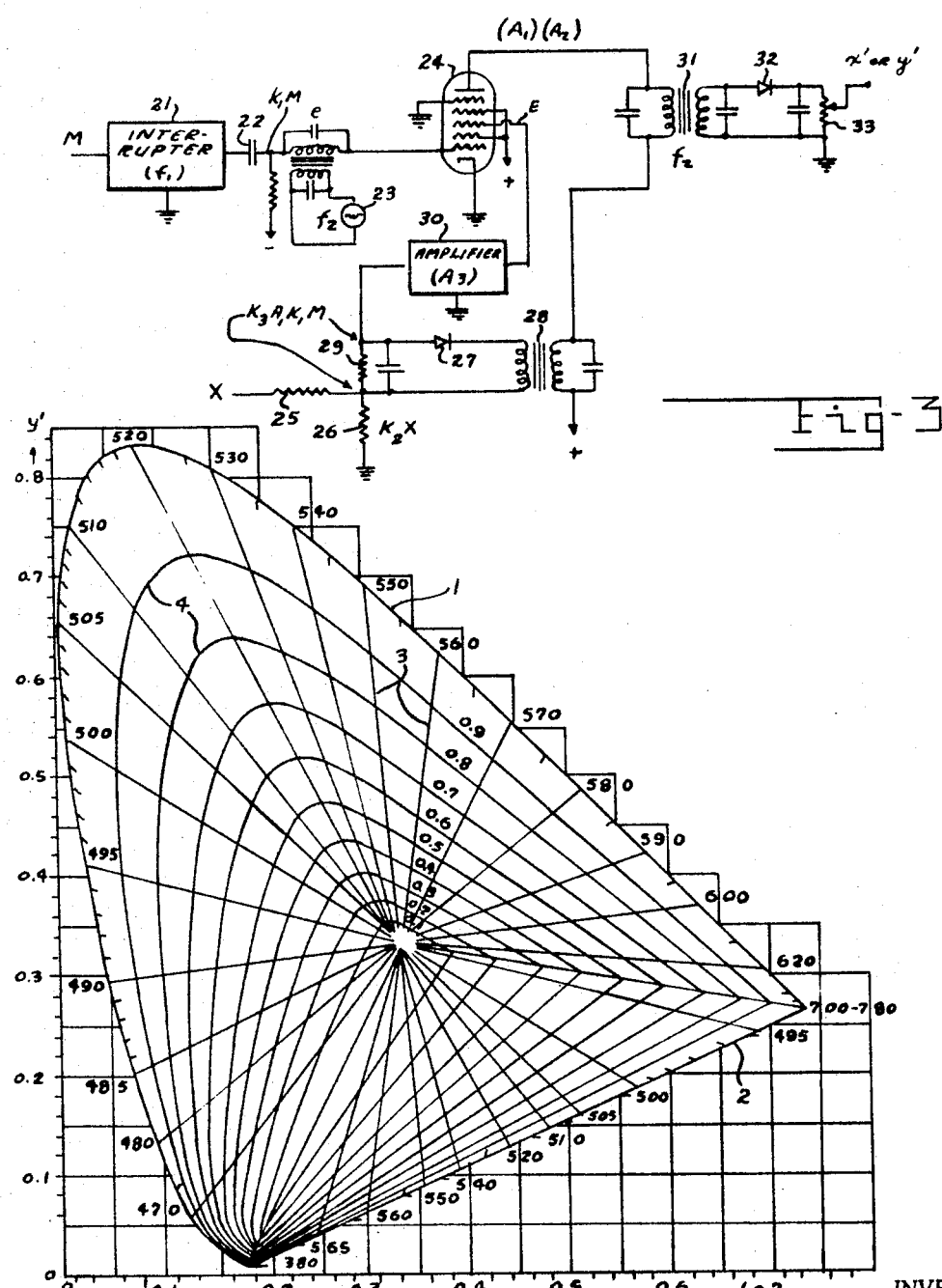
Figure 5:
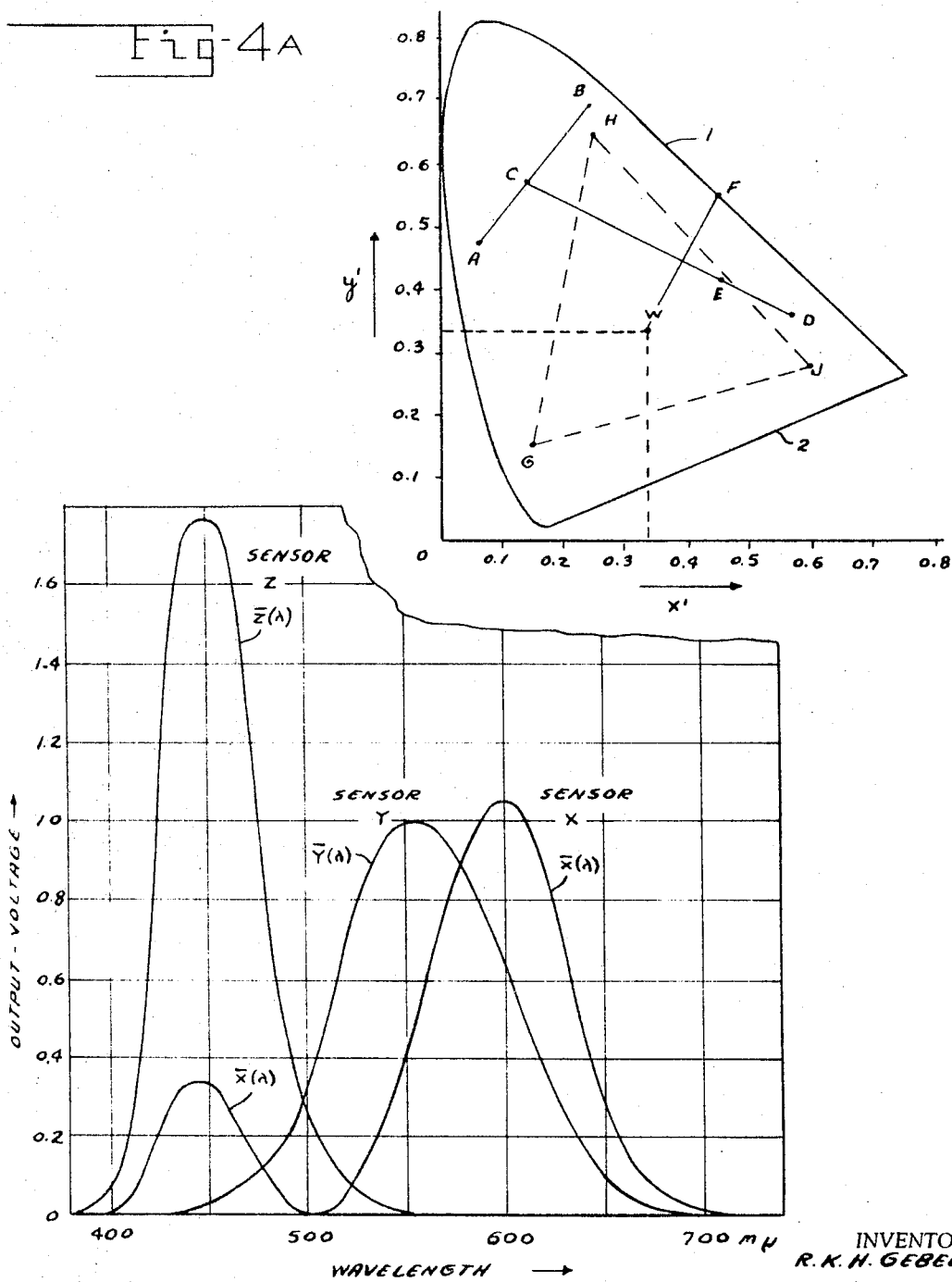
Figure 6:
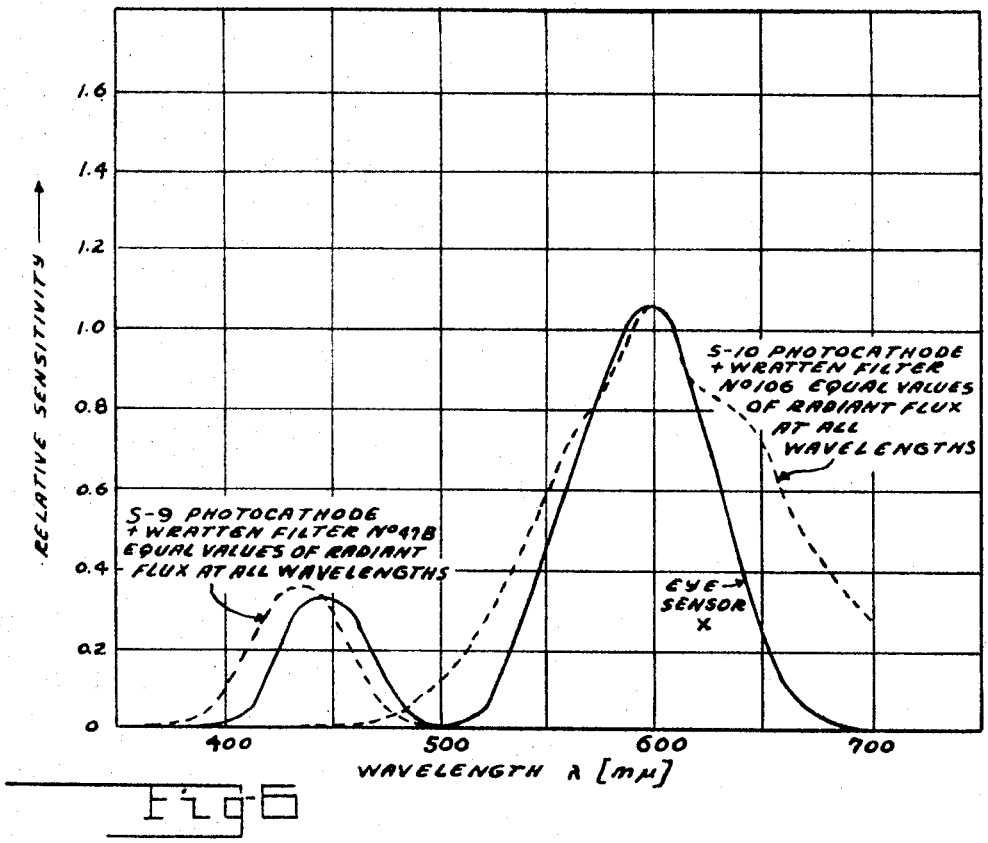
Figure 9:
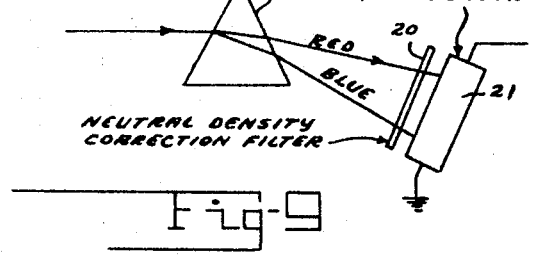
Figure 10:
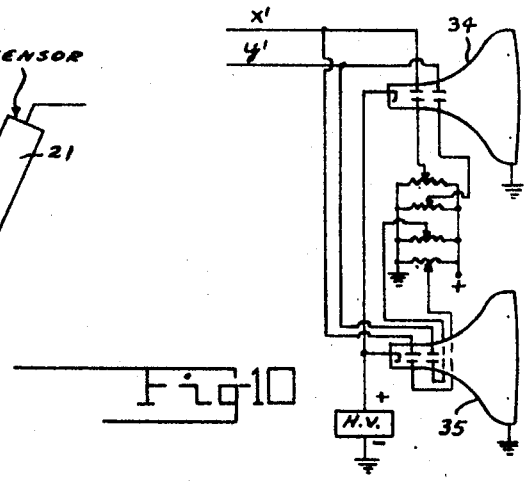
Figure 7:
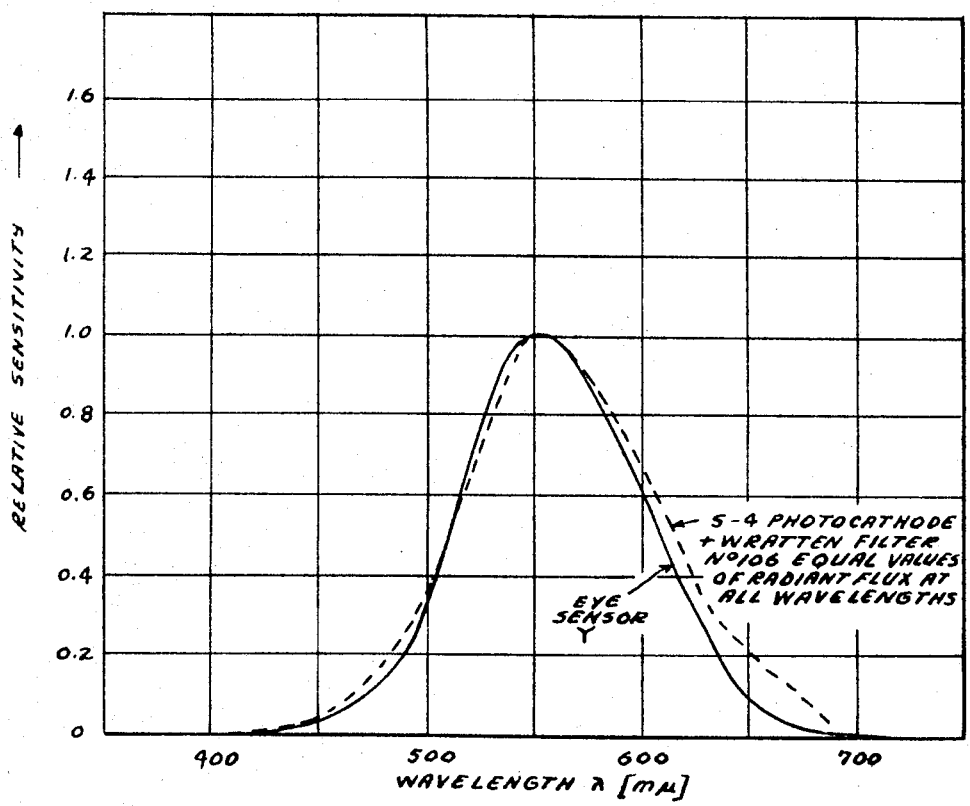
Figure 13:
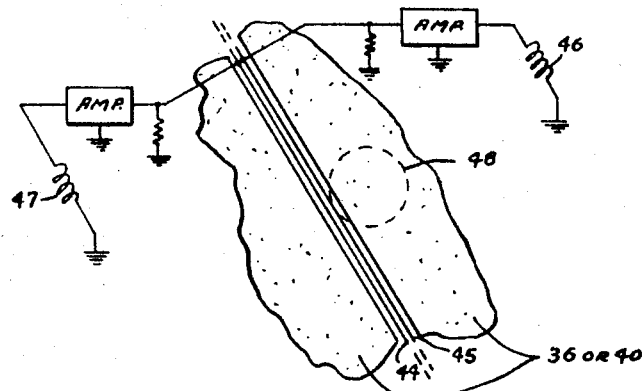
Figure 8:
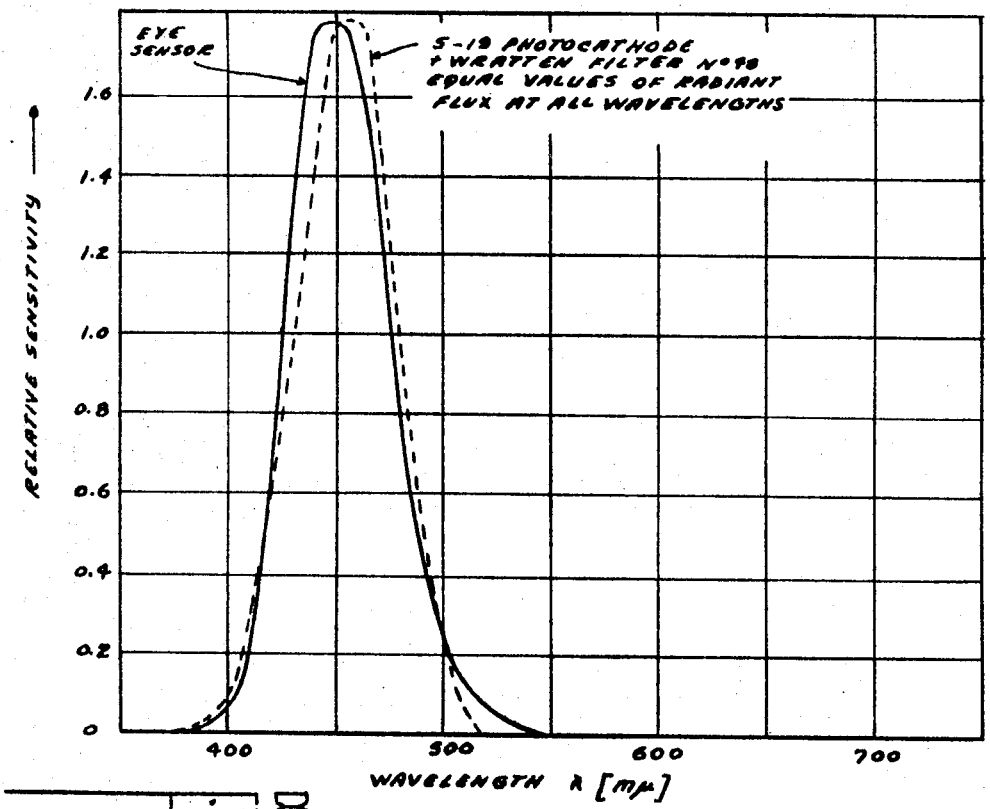
Figure 15:
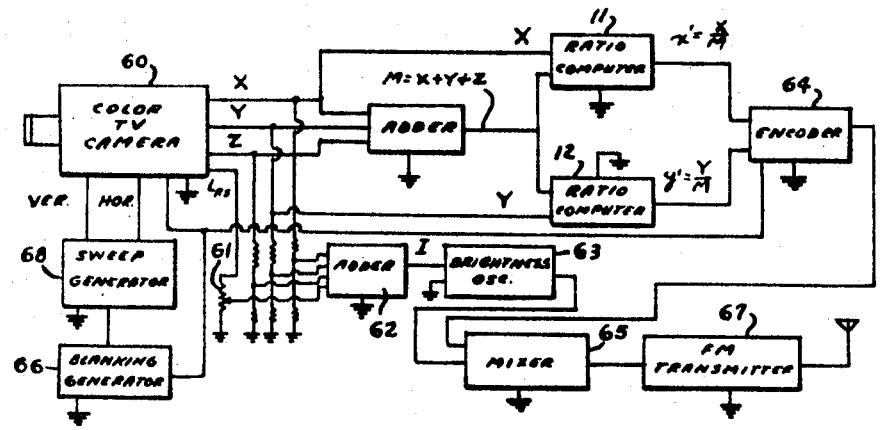
Figure 11:
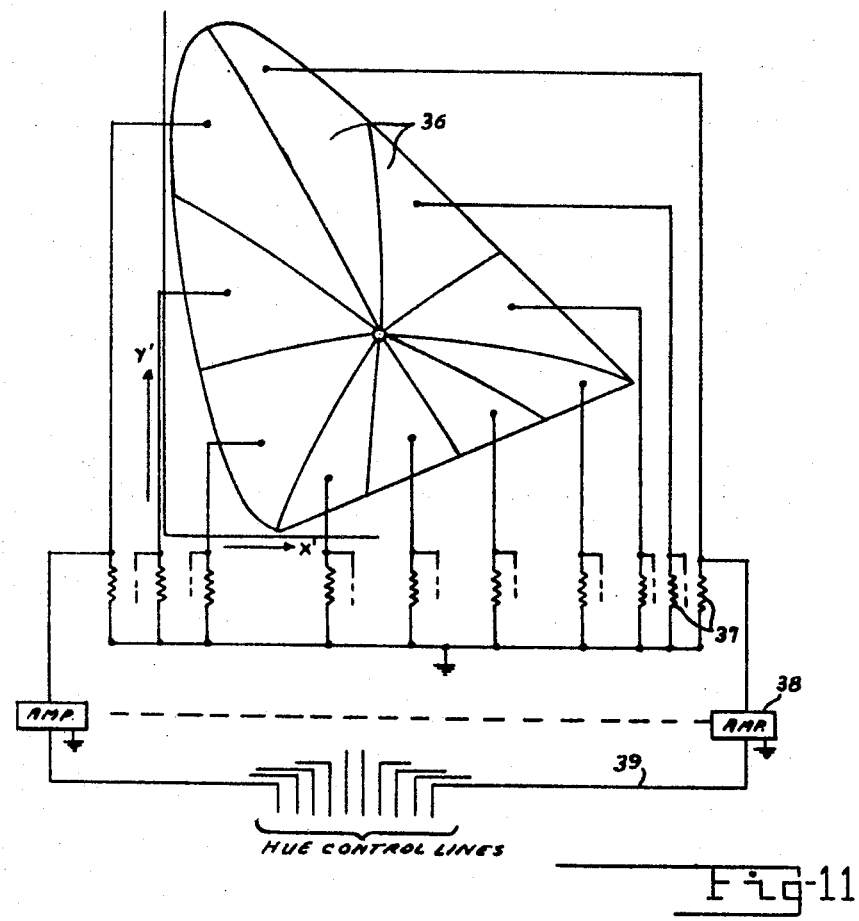
Figure 20:
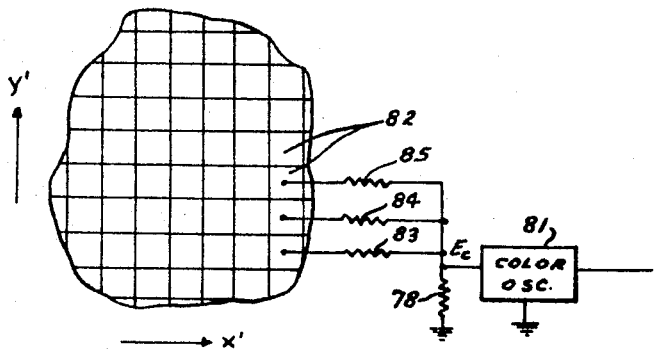
Figure 12:
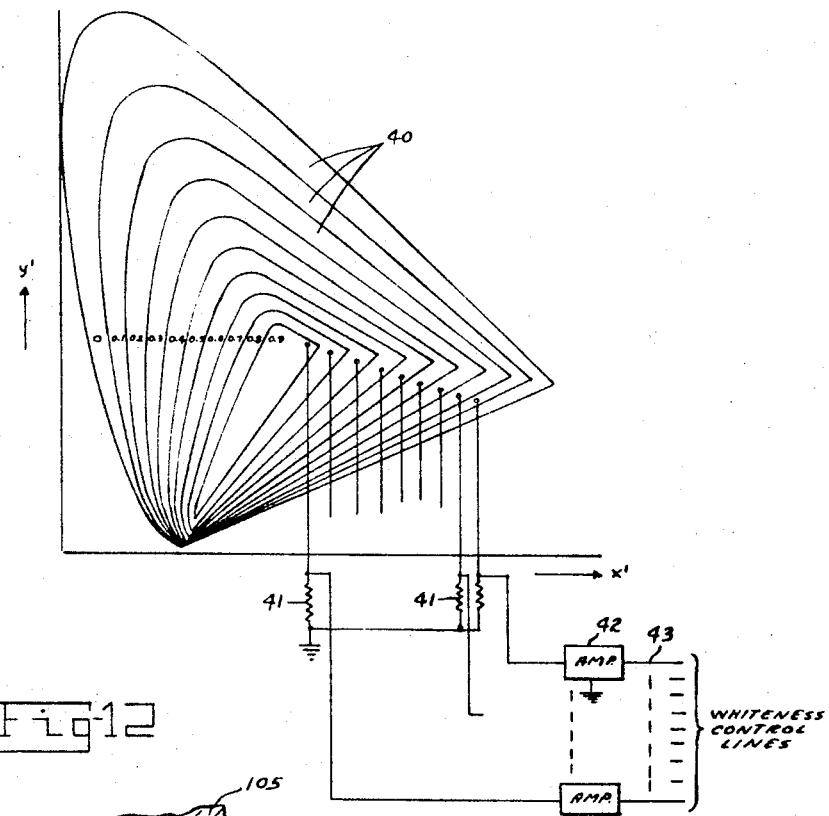
Figure 23:
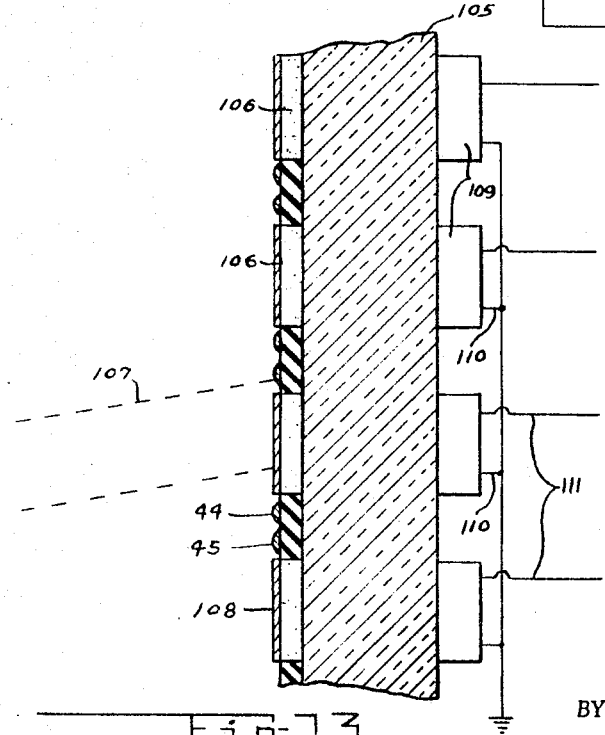
Figure 24:
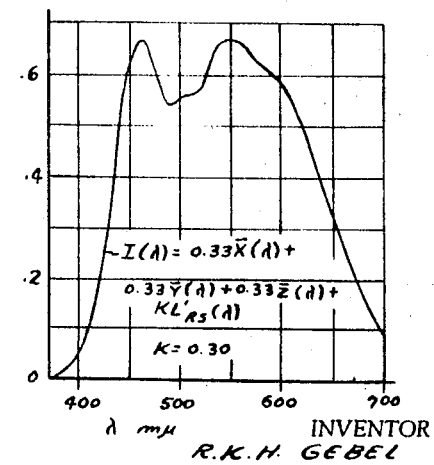
Figure 17:
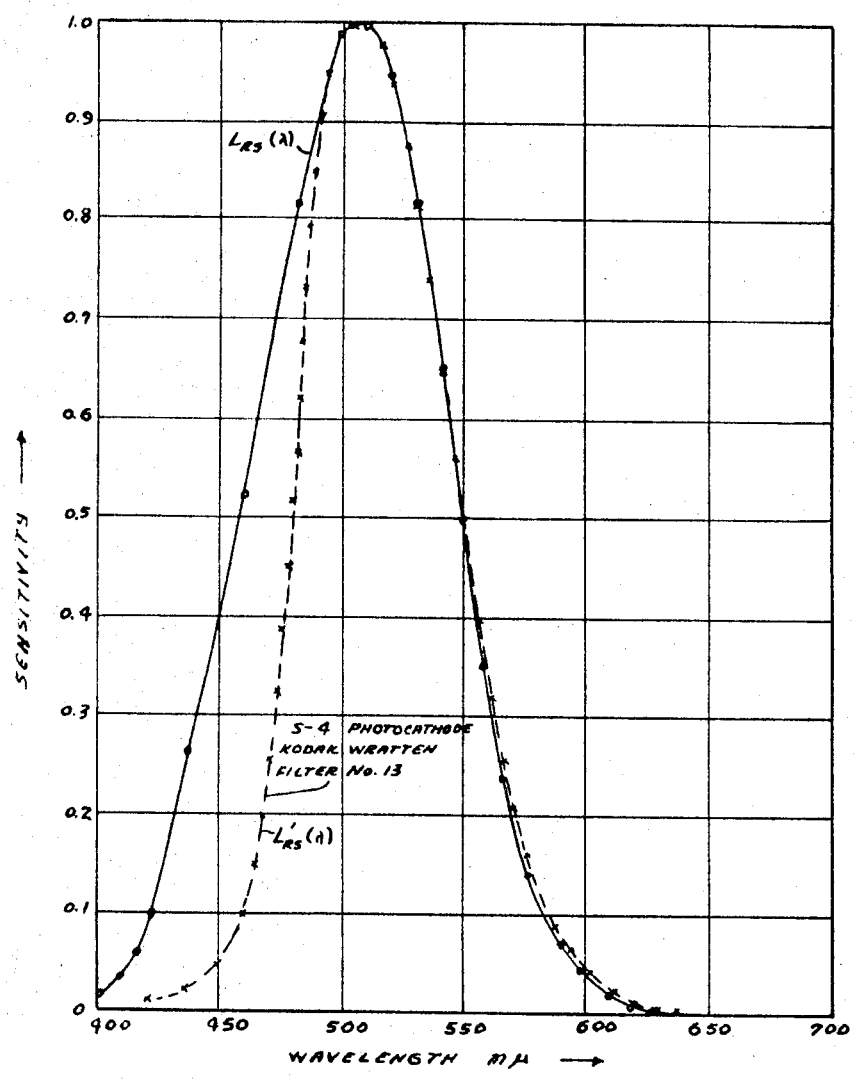
Figure 18:
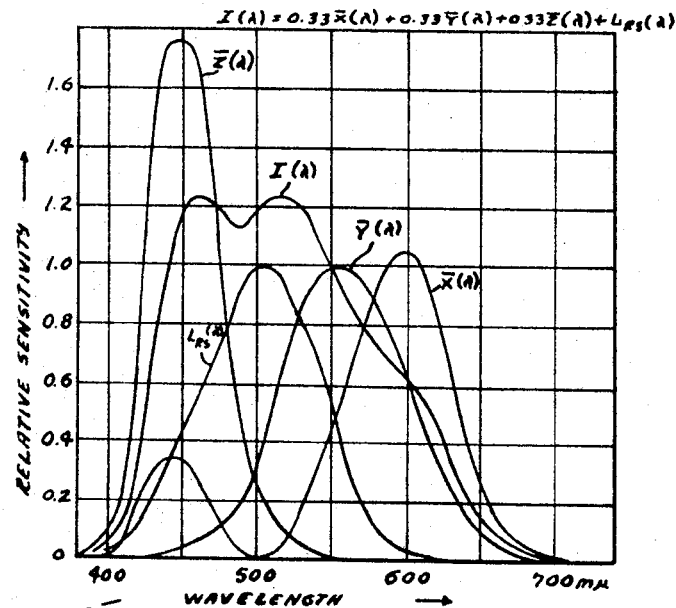
Figure 19:
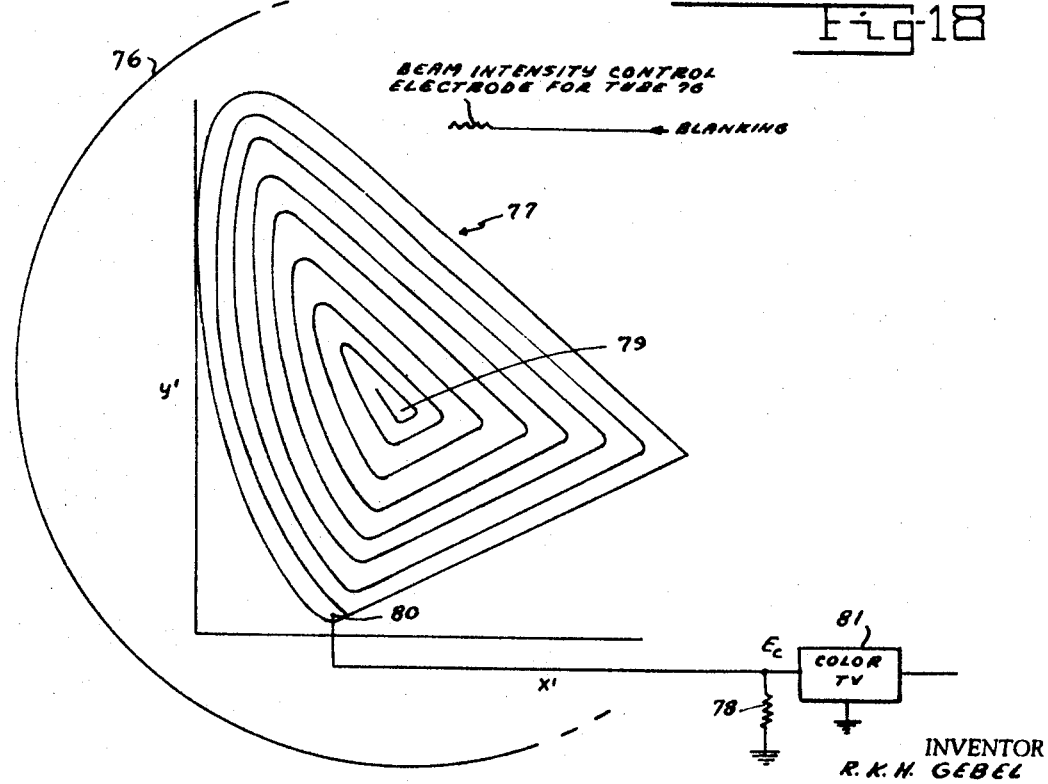

A more detailed explanation of the various aspects of the invention will be given with reference to the accompanying drawings in which FIG. 1 is a block diagram of apparatus for determining the chromaticity of a color, FIG. 1A is a variation of FIG. 1 for simulating the subjective color sensations of the eye, FIG. 2 shows details of the photoelectric system of FIG. 1, FIG. 3 is a schematic diagram of a ratio computer for use in FIG. 1, FIGS. 4 and 4a show and explain the C.I.E. color plane, FIG. 5 shows the tristimulus curves for the eye, FIGS. 6, 7 and 8 show filter-photocathode combinations for approximating the tristimulus curves of the eye, FIG. 9 shows another method for matching the tristimulus curves of the eye, FIGS. 10, 11 and 12 show modifications of FIG. 1 for determining chromaticity in terms of hue and whiteness, FIG. 13 shows a method of insuring that the electron beam falls on only one electrode in FIGS. 11, 12, 19 and 20, FIG. 14 illustrates with FIGS. 1, 10, 11 and 12 an automatic paint mixer, FIG. 15 is a block diagram of a color television transmitter in accordance with the invention, FIG. 16 shows details of the color camera of FIG. 15, FIG. 17 shows a filter-photocathode combination for producing the $L_{RS}$ function in the color television camera of FIG. 15, FIG. 18 illustrates the method of deriving the intensity or brightness function in FIG. 15, FIG. 19 shows one form of the color encoder of FIG. 15, FIG. 20 shows another form of the color encoder of FIG. 15, FIG. 21 is a block diagram of a color television receiver in accordance with the invention, FIGS. 22 and 23 show details of the color decoder of FIG. 21, and FIG. 24 shows the $I(\lambda)$ characteristic obtained from the filter-photocathode combinations of FIGS. 6, 7, 8 and 17.

It is known that the color of any luminous surface can be fully defined by three numbers X, Y and Z the values of which are $$X = \int E(\lambda)\overline{X}(\lambda)d\lambda$$
$$Y = \int E(\lambda)\overline{Y}(\lambda)d\lambda$$
$$Z = \int E(\lambda)\overline{Z}(\lambda)d\lambda$$

where $E(\lambda)$ represents the spectral distribution of the light emanating from the surface and the functions $\overline{X}(\lambda)$, $\overline{Y}(\lambda)$ and $\overline{Z}(\lambda)$, called the tristimulus values, represent the spectral sensitivities of three color sensors which, in accordance with the Young-Helmholtz color theory, are in each individual color sensitive area of the human retina. In tests conducted on a large number of observers the relative values of these functions for the spectrum of constant energy have been determined for the average observer and are shown in FIG. 5.

Changes in the amount of the radiation $E(\lambda)$ received from the luminous surface, i.e. changes in the brightness of the surface, change the absolute but not the relative values of X, Y and Z. Therefore, brightness is a factor in defining color and, in fact, the color sensation prouced by light of constant spectral content changes with the radiation intensity or brightness. What does not change with brightness is termned the chromaticity of the color. Chromaticity may be defined by three numbers $x$, $y$ and $z$ having the following values:

$$x = \frac{X}{X+Y+Z}$$

$$y = \frac{Y}{X+Y+Z}$$

$$z = \frac{Z}{X+Y+Z}$$

Since $$x + y + z = 1$$

it is clear that only two of the above three numbers are required to define a chromaticity, the numbers $x$ and $y$ being normally used. If the values of $x$ and $y$ are plotted with respect to $x$ and $y$ rectangular axes, then, it is apparent that all chromaticities lie within a triangle bounded by the lines $x=0$, $y=0$ and $x+y=1$. All chromaticities within this triangle, however, are not realizable. The realizable chromaticities lie within an area in the triangle bounded by the locus of the chromaticities of all the monochromatic relations in the visible spectrum and a straight line joining the extremities of this locus. The standard C.I.E. color plane derived in the above manner is shown in FIG. 4. The line 1, extending from the point representing the chromaticity of the radiation of wavelength 380 mµ at the extreme violet end of the spectrum to the point representing the chromaticity of the radiation of wavelength 780 mµ at the extreme red end of the spectrum, is the locus of the chromaticities of the visible monochromatic radiations or spectral colors. The straight line 2 joining the extremes of this locus and completing the boundary of the area of realizable chromaticities is the locus of the chromaticities of mixtures of extreme spectral violet and extreme spectral red which constitute the purple colors. The chromaticity for white is at the point $x=0.33$, $y=0.33$. When lights of two different chromaticities are additively mixed the resulting point in the color plane lies on a straight line joining the two chromatitices. Thus, as better seen in FIG. 4a, a mixture of A and B lies at a point such as C on the line joining A and B, the position of C being at the center of gravity of A and B which are assigned weights equal to $X+Y+Z$. If now a color at point D is added to the color at C, the chromaticity moves toward D along a straight line to a point such as E a distance depending upon the amount of D added. Further, if a spectral color such as that at point F is mixed with increasing amounts of W (white) the chromaticity moves along a straight line toward W, the resulting mixture decreasing in saturation or increasing in whiteness as W is approached. Thus, in FIG. 4, lines 3 are termed lines of constant hue or colorimetric purity and lines 4 are termed lines of constant saturation or whiteness. It follows that any chromaticity can be specified in terms of hue and saturation (or degree of whiteness) where hue is a color whose chromaticity lies on the spectral line 1 or the purple line 2. Additive mixtures of any three colors having chromaticties G, H and J (FIG. 4a) can produce any color having chromaticity lying within the area of the triangle defined by these three points. Because of the curvature in two sides of the area of realizable chromaticities, as shown in FIGS. 4 and 4a, there are no three realizable colors that can produce all of the visible colors; however, by a judicious choice of the three primary colors, a high proportion of the visible colors may be produced by their mixture.

It follows from the foregoing that the color sensation produced in the brain when viewing a luminous surface is determined by the intensity of the light emanating from the surface, i.e. its brightness, and by its chromaticity which, except for the chromaticities lying on the spectral line and the purple line in the color plane, is not spectrally unique. More detailed information on the problem of color and color perception may be found in an article entitled "The Colour Triangle" by W. deGroot and A. A. Kruithof, appearing in the Philips Technical Review, Vol. 12, No. 5, November 1950, and in the book entitled The Threshold of Visual Sensation in Comparison with that of Photosensors, Its Quantum Aspect, Problems of Color Perception, and Related Subjects by R. K. H. Gebel available from the Superintendent of Documents, U.S. Government Printing Office.

The color analyzer shown in FIG. 1 operates to determine the chromaticity of any given color and to position the beam of cathode ray tube 5 so that the spot of light on the screen occupies a position corresponding to the position of the chromaticity of the color in the color triangle. For direct reading of the chromaticity a transparent overlay of the color triangle of FIG. 4 may be provided on the screen of the cathode ray tube. As shown in FIG. 1, the analyzer is used to determine the chromaticity of the light reflected from a colored surface 6 which is illuminated by light from sources 7 and 8. The spectral distribution of sources 7 and 8 should correspond to that of the illumination under which the color of interest is to be normally observed. Light reflected from surface 6 enters photoelectric system 9 which has three sensors the outputs of which are designated X, Y and Z. The sensitivities of these sensors should correspond as nearly as possible to the functions $\bar{X}(\lambda)$ $\bar{Y}(\lambda)$ and $\bar{Z}(\lambda)$ shown in FIG. 5. The outputs X, Y and Z are applied to adder 10 which has an output $M=X+Y+Z$. The outputs X and M are applied to ratio computer 11 which has an output $$x' = \frac{X}{M}$$

and, similarly, the outputs Y and M are applied to ratio computer 12 which has an output $$y' = \frac{Y}{M}$$

The outputs $x'$ and $y'$ are the rectangualr coordinates of the chromaticity and are applied to the horizontal and vertical deflection circuits, respectively, of cathode ray tube 5. If the screen of tube 5 is provided with an overlay in the form of FIG. 4, as previously stated, the spot of light produced by the beam will indicate the position of the chromaticity in the C.I.E. color triangle, from which the chromaticity may be read in terms of $x'$, $y'$ values or in terms of hue and saturation.

The apparatus of FIG. 1 constitutes an opto-electrical analogy of the human visual organs in determining chromaticity. As is known, if white light is pulsed at a frequency below the fusion frequency of the eye a sensation of color is produced. This is known as the Prevost-Fechner-Benham subjective color phenomena. It has been assumed that these phenomena are due to transients in the outputs of the three color sensors in the retina. This effect may be simulated in the apparatus of FIG. 1 by inserting in the X, Y and Z outputs networks 13, 14 and 15 having different time constants. With this arrangement, the X, Y and Z outputs will have different values for pulsed white light than for steady white light with the result that the $x'$, $y'$ chromaticity values change and the chromaticity is displaced from the white point in the color triangle.

The details of the photoelectric system 9 of FIG. 1 are shown in FIG. 2. The incoming light is split into three components, by a suitable arrangement of partially reflecting and totally reflecting mirrors and directed into the X, Y and Z sensors. The X, Y and Z sensors comprise photomultipliers preceded in each case by a filter I, II or III and a neutral density filter 16, 17 or 18. For determinations relative to the C.I.E. color plane, the X, Y and Z sensors should have relative sensitivities corresponding to the $\bar{X}(\lambda)$, $\bar{Y}(\lambda)$ and the $\bar{Z}(\lambda)$ functions, respectively, of FIG. 5, i.e. to the tristimulus values of the eye. These sensitivities are controlled by the transmission characteristics of filters I, II and III and the spectral responses of the photocathodes of the photomultipliers. FIGS. 6, 7 and 8 give filter-photocathode combinations approximating the desired functions. For FIG. 6 where two different filters and two different photocathodes are required a composite filter and a composite photocathode may be employed. The neutral density filters 16, 17 and 18 serve to establish the correct relative amplitudes of the three functions.

FIG. 9 illustrates a method for more closely matching the tristimulus values. In this method the light is first dispersed in accordance with wavelength by prism 19 and passed through a neutral density correction filter 20 to the photosensor 21 which may be a photomultiplier as in FIG. 2. Filter 20 controls the amount of each wavelength reaching the photosensor. By properly designing the correction filter, taking into account the spectral response of the photosensor 21, any desired overall characteristic may be obtained.

The ratio computers 11 and 12 in FIG. 1 may be any suitable device for producing a voltage proportional to the ratios indicated. An example is shown in FIG. 3. Referring to this figure, the voltage M is converted by interrupter 21 and capacitor 22 into an alternating voltage $k_1 M$ of frequency $f_1$ which is applied along with alternating voltage $e$ of frequency $f_2$, derived from source 23, to the control grid of tube 24 the amplification factor of which may be controlled by varying the direct voltage E on its third grid. The direct voltage X is applied to a potential divider 25–26 producing a voltage $k_2 X$ across resistor 26. The output of tube 24 at frequency $f_1$ is coupled to rectifier 27 through transformer 28 tuned to $f_1$. The output of this rectifier, developed across resistor 29, has the value $k_3 A_1 k_1 M$, where $A_1$ is the gain of the tube 24 stage at $f_1$. The difference between the voltages across resistors 26 and 29 is amplified by amplifier 30 having gain $A_3$ to produce the gain control voltage E. The output of tube 24 at frequency $f_2$ is coupled by transformer 31, tuned to $f_2$, to rectifier 32 which produces the output voltage $x'$ at potentiometer resistor 33.

The principle of operation of the circuit of FIG. 3 is to make the gain of stage 24 proportional to $X/M$ and, since $e$ is constant, $x'$ will then be a constant times the gain or a constant times $X/M$. This may be seen from the following equations:

(1) $$E = (k_2 X - k_3 A_1 k_1 M) A_3$$

Rearranging 1, (2) $$A_1 = \frac{k_2 X - \frac{E}{A_3}}{k_3 k_1 M}$$

If $A_3$ is made very high, the term $E/A_3$ approaches zero, since E is relatively small, and the expression for $A_1$ becomes (3) $$A_1 = \frac{k_2 X}{k_3 k_1 M}$$

Since the gain $A_2$ of stage 24 at $f_2$ is a constant times the gain $A_1$ at $f_1$ (4) $$A_2 = \frac{k_4 k_2 X}{k_3 k_1 M}$$

(5) $$x' = e A_2 k_5 = \frac{e k_5 k_4 k_2 X}{k_3 k_1 M}$$

Since $e$ is a constant, (6) $$x' = K \frac{X}{M}$$

The voltage $y'$ is obtained in a similar manner.

FIGS. 10, 11 and 12 illustrate a modification of the chromaticity analyzer of FIG. 1 that indicates chromaticity in terms of hue and whiteness. For this purpose two cathode ray tubes 34 and 35 are required as shown in FIG. 10. Cathode ray tube 34 determines the hue of the analyzed color and for this purpose has on the inner surface of its screen an electrode structure such as shown in FIG. 11. The electrodes in this structure consist of a plurality of electrically separate roughly triangularly shaped electrodes 36 extending in the color plane from the spectral line and the purple line toward the white point. Each of these electrodes corresponds to a hue and is connected to an external circuit and to ground through a resistor 37. Consequently, when the electron beam rests on any particular electrode the beam current flowing in the resistor 37 produces a voltage thereacross which may be amplified in amplifier 38 and applied to control line 39, each control line representing a particular hue. The electrodes 36 may be metallic films formed on the inner surface of the cathode ray tube screen by any of the known processes for accomplishing this.

Cathode ray tube 35 determines the whiteness of the analyzed color and for this purpose has on the inner surface of its screen the electrode structure shown in FIG. 12. In this case the structure comprises a plurality of electrically separate electrodes 40, ten in the example shown, the boundaries of which correspond to lines of constant whiteness or saturation as shown in FIG. 4. Each electrode is connected to ground through an external circuit including a load resistor 41. Consequently, when the beam rests on any particular electrode the beam current flowing through the corresponding load resistor 41 produces a voltage thereacross which may be amplified in an amplifier 42 and applied to a control line 43, each control line corresponding to a degree of whiteness.

In order to prevent the electron beam from impinging on more than one electrode in FIGS. 11 and 12, the technique illustrated in FIG. 13 may be used. The space between adjacent electrodes 36 or 40 is provided with two small parallel wires or other conductors 44 and 45. These conductors are coupled through amplifiers to small deflection coils 46 and 47 on the cathode ray tube. As the beam 48 spills over the edge of an electrode and touches the adjacent conductor current flows in the deflecting coil. The alignment of the coil and the direction of the current flow are made such as to oppose any further movement of the beam toward the conductor. With sufficient amplifier gain, the beam is restrained to a position that barely touches the conductor, as illustrated. In this manner the beam is prevented from impinging on both electrodes by being deflected toward the electrode adjacent to the conductor drawing the greater beam current. Several systems of this type are required to protect all edges of the electrodes in FIGS. 11 and 12 because of their different directions.

Figure 14:
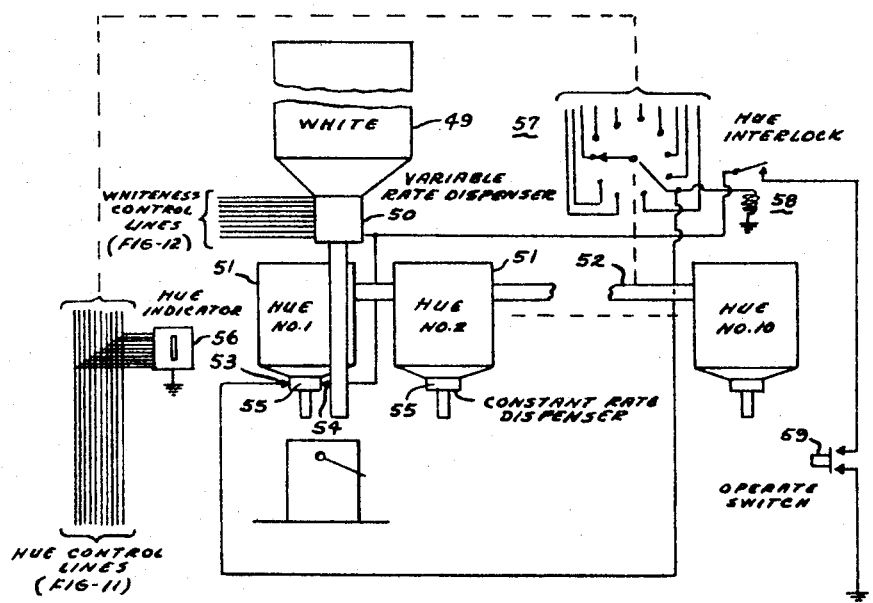
Figure 15:
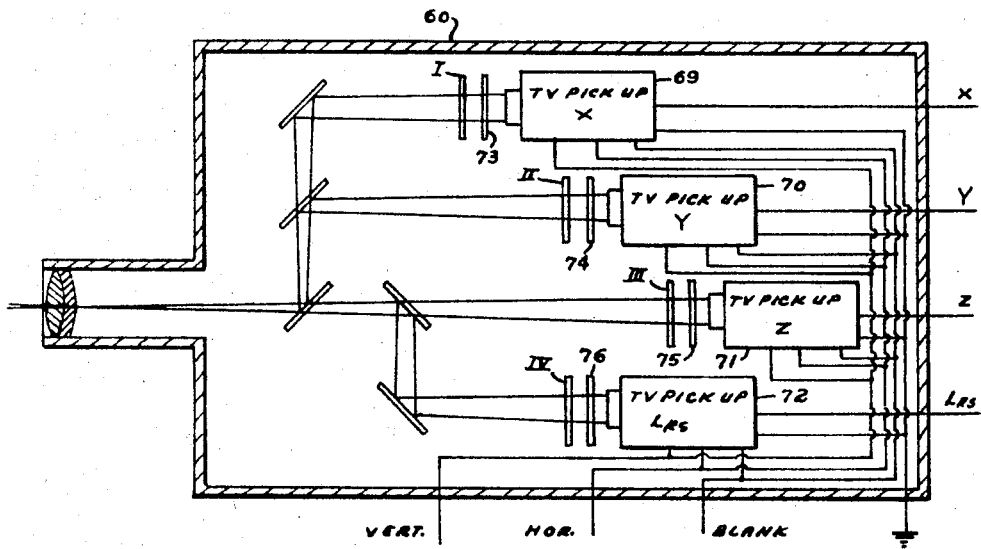

FIG. 14 together with FIG. 1 as modified in FIGS. 10, 11 and 12 consititute an automatic paint mixer capable of viewing a particular color under normal lighting conditions and mixing a paint that will match the color. The apparatus in FIG. 14 comprises a stationary container 49 for white paint having an outlet through an electrically actuated variable rate dispenser 50 controlled by the whiteness control lines from FIG. 12. There is also a container 51 for each of the hues which, in the example shown, are ten in number. The hue containers may be mounted on a movable structure 52, such as a turret, so that the proper hue may be brought into position near the white outlet. When in position, contacts 53 and 54 make connection to an electrically operated constant rate dispenser 55. The hue control lines from FIG. 11 actuate a hue indicator 56 which indicates the hue to be brought into position. These control lines also connect to a switch 57 which is actuated by movable structure 52 to energize interlock relay 58 when the proper hue is in position. With the interlock relay energized, depression of operate button 59 energizes the variable rate dispenser 50 and the constant rate dispenser 55 of the selected hue for s long as the button is depressed, the rate of dispsener 0, as determined by which of the whiteness control lines is energized, being such as to give the required chromaticity.

FIG. 15 shows the transmitter of a color television system incorporating a color analyzer of the type shown in FIG. 1. In the television system, in addition to transmitting the chromaticity of each elemental area in the scene, it is also necessary to transmit a signal representing the brightness of each elemental area. Previously, as shown for example in the above cited article by de Groot and Kruithof, the $\overline{Y}(\lambda)$ function has been considered the luminosity or visibility function of the eye. However, evidence including experience in providing the compatible grey scale signal in the color television signal has shown that this function is more like the $I(\lambda)$ function shown along with the $\overline{X}(\lambda)$, $\overline{Y}(\lambda)$ and $\overline{Z}(\lambda)$ in FIG. 18. Further, the function $I(\lambda)$ in this figure is obtained by combining the relative luminosity function for scotopic (rod) vision $R_{LS}(\lambda)$ with the functions $\overline{X}(\lambda)$, $\overline{Y}(\lambda)$ and $\overline{Z}(\lambda)$ for photopic (cone) vision in accordance with the equation $$I(\lambda) = 0.33\overline{X}(\lambda) + 0.33\overline{Y}(\lambda) + 0.33\overline{Z}(\lambda) + R_{LS}(\lambda)$$

indicating the likely influence of the rods in determining the eye's overall luminosity function. The color camera 60 is therefore provided with an additional sensor having a sensitivity linearly related to $L_{RS}(\lambda)$ illustrated in FIG. 18. The output of this sensor, adjustable in amplitude by potentiometer 61, together with the X, Y, Z outputs reduced by a factor 0.33 by the potential dividers shown, are applied to adder 62 to produce the intensity or brightness signal I at its output. The brightness signal frequency modulates brightness oscillator 63. The encoder 64 is a device for converting the chromaticities represented by the voltages $x'$ and $y'$ to different frequencies. Therefore, for each elemental area of the scene viewed by the color camera 60, a frequency representing chromaticity and a frequency representing brightness are applied to mixer 65 where they are linearly combined and applied as modulating signals to FM transmitter 67. The blanking pulses from blanking generator 66 are also applied to the encoder 64 and, as will be seen later, cause the encoder to have a fixed reference frequency output during the blanking intervals.

As stated earlier, the television system described herein is intended for long range narrow bandwidth operation as would be desirable in a system for space exploration. In transmitting a color picture of a planet, for example, the system in most cases would not be called upon to transmit rapid motion. Therefore the frame rate and the scanning rate as provided by sweep generator 68 may be very low which reduces the bandwidth requirements. Also the above described frequencies representing chromaticity and brightness may be in the low audio frequency range which further reduces the bandwidth requirements.

The color camera 60 of FIG. 15 is shown in more detail in FIG. 16. Light from the area viewed by the camera is split into four components by a system of partially transparent and totally reflecting mirrors. Four television pickup tubes 69, 70, 71 and 72 are provided, each receiving one of the four light components through a pair of filters the first of which, number I, II, III or IV, has a spectral transmission characteristic which, when taken with the spectral characteristic of the photocathode in the pickup tube, provides the desired spectral sensitivity for the particular channel. Neutral density filters 73, 74, 75 and 76 serve to adjust the relative output amplitudes of the four channels. As for the photoelectric system 9 in FIG. 1, FIGS. 6, 7 and 8 show filter-photocathode combinations approximating the desired $\overline{X}(\lambda)$, $\overline{Y}(\lambda)$ and $\overline{Z}(\lambda)$ functions. In the case of FIG. 6, however, two photocathodes and two filters are required. While this could be accomplished in FIG. 2 by a composite filter and a composite photocathode, in FIG. 16 two filters and two pickup tubes would be required to match the curve in FIG. 6. However, there are two methods whereby a single tube may be used. One method is to provide a single filter-photocathode combination that closely approximates the $\overline{X}(\lambda)$ function of FIG. 6, which is possible in the present state of the art, and the other is to omit the 400-500 m$\mu$ portion of the function which can be done without a serious loss in color accuracy. FIG. 17 illustrates a filter-photocathode combination providing the function $L_{RS}'(\lambda)$ that approximates the $L_{RS}(\lambda)$ function. FIG. 24 illustrates the I function produced at the output of adder 62 with potentiometer 61 set so that $K = 0.3$. This function closely approximates the $I(\lambda)$ function of FIG. 18 in shape. The amplitude may be adjusted by amplification if necessary.

The encoder 64 of FIG. 15 may take the form of a cathode ray tube 76, which is analogous to cathode ray tube 5 of FIG. 1, having a resistive spiral 77 on the inner surface of its screen, as shown in FIG. 19. The spiral covers the area of the C.I.E. color plane containing the realizable chromaticities, as seen in FIG. 4. When the beam impinges on the spiral, beam current flows through the spiral and resistor 78 producing a voltage $E_c$ across this resistor the value of which depends upon the point in the spiral on which the beam falls. The spiral starts at the white point 79 in the C.I.E. plane and ends at the point 80 representing the extreme violet end of the visible spectrum. Consequently, when the $x'$, $y'$ voltages represent the chromaticity of white the voltage $E_c$ has a minimum value and when the $x'$, $y'$ voltages represent the chromaticity of violet this voltage has its maximum value. At all other positions in the area $E_c$ lies between these values, but has a zero value when the beam does not strike the spiral at all, which occurs during the blanking intervals of the scanning process when the beam is cut off by the blanking pulse applied to encoder 64 (FIG. 15). The voltage $E_c$ controls the frequency of color oscillator 81 so that it oscillates at a different frequency for each resolvable chromaticity. The ability of the spiral to resolve elemental areas in the chromaticity diagram will of course depend for one thing upon the width of the resistive strips forming the spiral. The color oscillator 81 may be an oscillator of any type the frequency of which may be controlled by a direct voltage, for example, a multivibrator. The frenquency of the oscillator when $E_c = 0$ may be transmitted as a reference frequency for the discriminators at the receiver, to be explained later. The technique of FIG. 13, although not shown in FIG. 19 for simplicity, may be used to prevent the beam from impinging simultaneously on adjacent turns of the spiral.

FIG. 20 shows another form which the color encoder may take. In this arrangement small elemental electrically separate conductive areas 82 cover the chromaticity diagram rather than the spiral of FIG. 19. Each area represents a resolvable chromaticity and is connected in series with resistor 78 through external resistors such as 83, 84 and 85, all having different values of resistance. Therefore, the value of $E_c$ and the frequency of oscillator 81 depend upon which of the elemental areas receives the electron beam. As the number of elemental areas is increased and their sizes become smaller the number of chromaticities that may be resolved increases, the ultimate being a multiplicity of pin electrodes extending through the screen of the cathode ray tube. The technique of FIG. 13 may also be used in this case to insure that the beam falls on only one elemental area at a time.

The brightness oscillator 62 of FIG. 15 may be similar to color oscillator 81 since the output of adder 62 is a direct voltage; however, the frequency bands of the two oscillators should be selected so as not to interfere with each other. As for the color oscillator, the frequency of the brightness oscillator during the blanked intervals of the scanning process when the output of adder 62 is zero is taken as the reference frequency.

FIG. 21 shows the receiving end of the color television system. The FM signal from the transmitter of FIG. 15 is received and demodulated by FM receiver 86, the brightness, brightness reference, color and color reference frequencies appearing in the receiver output. These signals are directed into different channels by brightness, brightness reference, color and color reference bandpass filters 87, 88, 89 and 90, respectively, and after amplitude limitation are applied to discriminators 91, 92, 93 and 94 for conversion to proportionate direct voltages.

As stated earlier, the color reference frequency is transmitted during the blanking intervals. Therefore the output of the color reference discriminator 95 may be used as a blanking pulse and for this purpose is added to the brightness signal in adder 96 and applied to the intensity control electrode in 3-color cathode ray reproducer 97 for controlling the intensities of the three beams simultaneously. This is shown schematically in FIG. 22. The output of discriminator 95 is also applied to synchronizing signal separator 98 which separates the horizontal and vertical blanking pulses on the basis of their relative durations and applies them as synchronizing signals to horizontal and vertical sweep generators 99 and 100 which supply sweep voltages to reproducer 97. The color and brightness reference signals are indicated by frequency indicators 101 and 102, respectively, and this information is used in aligning color and brightness discriminators 94 and 92 to give the correct color and brightness outputs should frequency drift occur in the color and brightness oscillators at the transmitter. This alignment may be either automatic or manual, the latter being feasible in the described system because of the low rate at which information is transmitted.

The color signal obtained from discriminator 94 is applied to color decoder 103 which causes the three beams of the cathode ray tube reproducer 97 to be adjusted to the relative intensities required to reproduce the color called for by the magnitude of the color signal. The color decoder is shown in FIGS. 22 and 23. It comprises a cathode ray tube 105 having a single row of small phosphor areas 106 arranged in a straight line on its screen as seen in the enlarged cross section of the screen shown in FIG. 23. The color signal from color discriminator 94 and low pass filter 104 (FIG. 21), which is a direct voltage corresponding to the encoder 64 output in FIG. 15, is applied to a deflection system for tube 105 which deflects beam 107 in a single direction along the row of phosphor areas 106. The phosphor areas may have an electron pervious aluminum backing 108 for increased efficiency. Small conductors 44 and 45 may also be included between the phosphor areas to insure that the beam falls on only one phosphor area at a time in accordance with the technique of FIG. 13. On the outside of the end plate of tube 105 directly opposite each of the phosphor areas is situated a photoconductor element 109 which receives light from the phosphor area when the phosphor area is energized by the beam. The photoconductors have one common lead 110 connected to ground and individual leads 111 coupled through load resistors 112 and a source of voltage (not shown) to ground to complete the circuit. The voltages developed across these load resistors are applied as control voltages to an equal number of like color control circuits for 3-color picture tube 97. Two of these circuits are shown in FIG. 22. Tube 113, which is the input tube for one of the control circuits, is connected as a cathode follower and has its output applied to the control grids of pentodes 114, 115 and 116 in parallel. When light is not being received by the photoconductor 109 associated with tube 113 this tube is biased to cutoff, or to sufficiently low conduction that the grid voltages for tubes 114, 115 and 116 are below the cutoff point. On the other hand, when light is being received by the photoconductor element its conduction increases, which increases the grid potential of tube 113 and raises the grids of tubes 114, 115 and 116 above cutoff, causing anode conduction in these tubes. The amount of conduction in each tube and hence the anode voltage of the tube may be adjusted by controlling the screen grid potential through the agency of potentiometer 117, 118 or 119. The anode voltages control the biases and therefore the beam intensities of the blue, green and red guns in the color tube 97. In this manner, the anode voltages in each set of three tubes is adjusted to produce a color on the screen of tube 97 that has the chromaticity represented by the phosphor area in tube 105 with which the control circuit is associated.

Where the frame frequency is too low for direct viewing of the received picture a color camera 120, as seen in FIG. 21, may be used to photograph the image on the screen of tube 97 as it is formed. The vertical synchronizing signal may be used to advance the camera. Also, a tape recorder 121 may be used to record the complete incoming color signal which is easily done because of the low frequencies involved.

I claim:

1. A color television system comprising: a color television camera with associated horizontal and vertical sweep circuits and a horizontal and vertical blanking pulse generator, said camera having X, Y and Z output signals supplied by X, Y and Z television pickup tubes having sensitivities that are functions of wavelength substantially corresponding to the spectral distribution curves of the three color sensors of the eye, and having an $L_{RS}$ output signal supplied by a television pickup tube having a sensitivity that is a function of wavelength substantially corresponding to the spectral distribution of the eye's sensitivtiy for scotopic vision; means for adding the X, Y and Z signals to produce a sum signal M; means receiving said sum signal and said X signal for producing an $x'$ signal equal to the ratio $X/M$, and means receiving said sum signal and said Y signal for producing a $y'$ signal equal to the ratio $Y/M$, said $x'$ and $y'$ signals representing the rectangular coordinates of chromaticities; a color encoder receiving said $x'$ and $y'$ signals and producing an audio frequency color signal of different frequency for each chromaticity represented thereby, said encoder also receiving blanking pulses from said blanking generator and producing a fixed frequency reference signal during each of said pulses; means adding said X, Y, Z and $L_{RS}$ signals in predetermined relative amounts to produce an intensity signal; means receiving said intensity signal and producing an audio frequency brightness signal the frequency of which is proportional to the magnitude of said brightness signal; a radio transmitter; means for applying said color signal and said brightness signal as modulating signals to said transmitter; a radio receiver for receiving and demodulating the signal radiated by said transmitter; bandpass filters coupled to the output of said receiver for separating the brightness signal, the color signal and the color reference signal from the receiver output; discriminators coupled to the outputs of said filters for producing signals having amplitudes directly related to the frequencies of the brightness, color and color reference signals, respectively; a cathode ray color image reproducer having three color electron beam guns; means adding the output of the brightness signal discriminator and the output of the color reference signal discriminator together and means for controlling alike the intensities of the beams in said three guns in accordance with the sum of these outputs, the output of said color reference signal discriminator acting as blanking pulses; horizontal and vertical sweep generators coupled to said image reproducer; means coupled to the output of said color reference signal discriminator for separating the horizontal and vertical blanking pulses and utilizing same to synchronize the horizontal and vertical sweep generators, respectively; a plurality of normally inoperative color control circuits coupled in parallel to the three color guns of said image reproducer, each control circuit being adjusted to produce when operative a different color in said reproducer; and a color decoder coupled to the output of the color signal discriminator and to said color control circuits for rendering one of said control circuits operative at a time depending upon the magnitude of said color signal discriminator output.

2. Apparatus as claimed in claim 1 in which said encoder comprises a cathode ray tube and associated high voltage supply, said tube having a beam intensity control electrode and two rectangularly related deflecting means; means applying said $x'$ signal to one deflecting means and said $y'$ signal to the other; means for applying said blanking pulses to said beam intensity control grid; a resistive spiral on the beam side of the screen of said cathode ray tube covering an area corresponding to the area of realizable chromaticities in the C.I.E. color plane; and external lead connecting one end of said spiral through a load resistor to the positive terminal of the high voltage source for said tube whereby the voltage across said load resistor depends upon the point in said spiral on which the beam of said tube impinges; a variable frequency oscillator; and means for applying the voltage across said load resistor to said oscillator as a frequency control voltage.

3. Apparatus as claimed in claim 1 in which said encoder comprises a cathode ray tube and associated high voltage supply, said tube having a beam intensity control electrode and two rectangularly related deflecting means; means applying said $x'$ signal to one deflecting means and said $y'$ signal to the other; means for applying said blanking pulses to said beam intensity control grid; a plurality of elemental electrically separate conductive areas on the beam side of the screen of said cathode ray tube covering an area corresponding to the area of the realizable chromaticities in the C.I.E. color plane; external leads connecting each elemental conductive area through a different series resistor and a load resistor to the positive terminal of the high voltage source for said tube whereby the voltage across said load resistor depends upon the elemental area on which the beam of said tube impinges; a variable frequency oscillator; and means for applying the voltage across said load resistor to said oscillator as a frequency control voltage.

4. Apparatus as claimed in claim 1 in which said decoder comprises a cathode ray tube having deflecting means for deflecting its beam along a line on the tube screen; means for applying the output of said color signal discriminator to said deflecting means; and means arranged along said line of deflection and cooperating with said beam and connected to said color control circuits for rendering one of said control circuits operative at a time depending upon the position of said beam along said line of deflection.

References Cited
UNITED STATES PATENTS

| | | | |
|---|---|---|---|
| 2,492,926 | 12/1949 | Valensi | 178—5.2 |
| 2,920,131 | 1/1960 | Valensi | 178—5.2 |
| 2,982,811 | 5/1961 | Valensi | 178—5.2 |
| 3,181,987 | 5/1965 | Polevitzky | 178—5.2 X |

JOHN W. CALDWELL, *Acting Primary Examiner.*

J. A. O'BRIEN, *Assistant Examiner.*